March 22, 1932.                R. M. PFALZGRAFF                1,850,726
                              LAMINATED CORE STRUCTURE
                                 Filed May 20, 1931
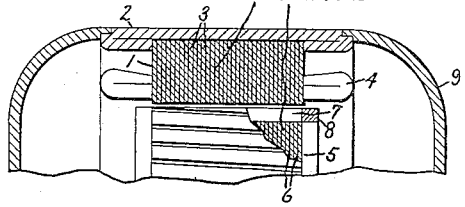
LAMINATIONS INSULATED FROM EACH OTHER
BY AN INSULATING COATING OR FILM INCLUDING
A BASIC IRON PHOSPHATE COMPOUND
Inventor:
Ross M. Pfalzgraff,
by Charles E. Tullar
His Attorney.

Patented Mar. 22, 1932

1,850,726

UNITED STATES PATENT OFFICE

ROSS M. PFALZGRAFF, OF LYNN, MASSACHUSETTS, ASSIGNOR TO GENERAL ELECTRIC COMPANY, A CORPORATION OF NEW YORK

LAMINATED CORE STRUCTURE

Application filed May 20, 1931. Serial No. 538,833.

My invention relates to a laminated core structure for electrical apparatus.

In electrical apparatus such as dynamo-electric machines, transformers, and the like, it has been the practice heretofore in making laminated core structures to use an insulating varnish on the sheet metal laminations for reducing the eddy current loss in the core. A good quality insulating varnish has considerable thickness, and this reduces the number of laminations per inch giving a low space factor of the laminations. For this reason the decrease in eddy current loss obtained by the insulating material on the laminations is off-set by the requirement of a higher flux density in the core structure resulting in an increase in core loss.

The object of my invention is to effectively insulate the sheet metal laminations of a laminated core structure to decrease the eddy current loss, and at the same time have a high space factor of the laminations, thereby requiring a lower flux density in the core structure and obtaining a decrease in core loss. I accomplish this by insulating the laminations from each other by an insulating coating or film including a basic iron phosphate compound.

Further objects and advantages of my invention will become apparent as the following description proceeds, and the features of novelty which characterize my invention will be pointed out with particularity in the claims annexed to and forming a part of this specification.

In the drawing, the single figure is a fragmentary sectional view of a dynamo-electric machine provided with laminated core structures embodying my invention.

Referring to the drawing, I have shown my invention as applied to a dynamo-electric machine including a core structure 1 supported in a cylindrical shell 2, and comprising a stack of sheet metal laminations 3 provided with slots in which the windings 4 are arranged. The rotatable member, which is mounted on a shaft, includes a core structure 5 comprising a stack of sheet metal laminations 6. These laminations are provided with slots in which bare conductors 7 of a squirrel cage winding are arranged and insulated therefrom by a basic iron phosphate coating, as hereinafter explained. The conductors 7 are connected by end rings 8. The shaft of the rotatable member is arranged in bearings in the end heads 9 which are secured to the ends of the shell 2 in any convenient manner.

In accordance with my invention the sheet metal laminations 3 and 6 of iron or steel, or alloys thereof, are provided with a basic iron phosphate coating as described, for example, in United States Letters Patent No. 1,341,100 to Allen, issued May 25, 1920, or in any other suitable manner. In the above patent the article to be coated is immersed in a solution of dilute phosphoric acid with iron scales (iron oxide) dissolved therein, the iron oxide serving as a source of iron and hastening the chemical reaction to form an iron phosphate coating on the surface of the article which I have found has very good insulating qualities. In making the laminated core structures 1 and 5 I prefer to use sheet steel punchings and generally these punchings have mill scale or iron oxide on the surfaces thereof. It is not necessary to remove the iron oxide from the surfaces of the punchings as the iron oxide serves as the source of iron when the punchings are immersed in a solution, such as dilute phosphoric acid, which is capable of chemically reacting to form a basic iron phosphate coating. In this manner the iron oxide on the surfaces of the punchings is essentially converted to an iron phosphate coating without any substantial change in the overall thickness of the punchings.

I have found an iron phosphate coating very effective as an insulating material, and as it forms a very thin film on the contacting surfaces of the punchings, the number of punchings that can be stacked for a given physical height of core structure is considerably greater than when other coatings are used, so that a high space factor is obtained. Thus the eddy current loss is effectively decreased when an iron phosphate insulating coating is used on the laminations and the increase in the number of punchings per inch used lowers the flux density required for the core structure which reduces the core loss.

A further advantage of my invention is the high heat resisting property of the iron phosphate coating. In casting conductors in a core structure, aligned openings or slots are provided in the punchings and filled with molten metal, such as aluminum, which hardens after cooling to form conductor bars. The iron phosphate coating does not break down when heated by the molten metal and effectively insulates the bars from the punchings.

A reduction in load loss is obtained when an iron phosphate insulating coating is used in a cast laminated rotor of a dynamo-electric machine, the bars for securing the laminations together being spaced about the periphery of the rotor to form the armature conductors. Under load conditions of the machine there is a tooth pulsation core loss due to tooth flux pulsations, and by having the rotor bars insulated from the punchings the magnitude of the tooth flux pulsations is decreased to reduce the tooth pulsation core loss, resulting in a reduction of load loss.

Although I have shown my improved laminated core structure as applied to a dynamo-electric machine, I do not desire my invention to be limited to the particular arrangement set forth, and I intend in the following claims to cover all changes and modifications which do not depart from the spirit and scope of my invention.

What I claim as new and desire to secure by Letters Patent of the United States is:

1. A core structure for electrical apparatus comprising a stack of laminations, and means including a basic iron phosphate coating for insulating said laminations from each other.

2. A core structure for electrical apparatus comprising a stack of sheet metal laminations having an insulating coating including a basic iron phosphate on their contacting surfaces.

3. A core structure for electrical apparatus comprising a stack of sheet metal laminations provided with aligned slots, said laminations having an insulating coating including a basic iron phosphate on their surfaces and their edges about the slots, and bare conductors in the slots in said laminations insulated therefrom by said coating.

4. A core structure for electrical apparatus comprising a stack of sheet metal laminations provided with aligned openings, said laminations having an insulating coating including a basic iron phosphate on their contacting surfaces and their surfaces about the openings therein, and means including bars extending through the openings for securing said laminations together.

In witness whereof I have hereunto set my hand.

ROSS M. PFALZGRAFF.